United States Patent
Song et al.

(10) Patent No.: US 11,264,609 B2
(45) Date of Patent: Mar. 1, 2022

(54) METHOD OF MANUFACTURING CATHODE COMPOSITE FOR ALL-SOLID-STATE BATTERY AND METHOD OF MANUFACTURING ALL-SOLID-STATE BATTERY COMPRISING SAME

(71) Applicants: Hyundai Motor Company, Seoul (KR); KIA Motors Corporation, Seoul (KR)

(72) Inventors: In Woo Song, Gwacheon-si (KR); Ju Yeong Seong, Suwon-si (KR); Yun Sung Kim, Seoul (KR); Hong Seok Min, Yongin-si (KR); Yong Jun Jang, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/703,185

(22) Filed: Dec. 4, 2019

(65) Prior Publication Data

US 2020/0403227 A1    Dec. 24, 2020

(30) Foreign Application Priority Data

Jun. 21, 2019 (KR) .................. 10-2019-0074273

(51) Int. Cl.
| | |
|---|---|
| *H01M 4/36* | (2006.01) |
| *H01M 4/04* | (2006.01) |
| *H01M 4/1391* | (2010.01) |
| *H01M 4/505* | (2010.01) |
| *H01M 10/0525* | (2010.01) |
| *H01M 10/0562* | (2010.01) |
| *H01M 10/058* | (2010.01) |
| *H01M 4/525* | (2010.01) |
| *H01M 4/02* | (2006.01) |

(52) U.S. Cl.
CPC ......... *H01M 4/364* (2013.01); *H01M 4/0407* (2013.01); *H01M 4/1391* (2013.01); *H01M 4/505* (2013.01); *H01M 4/525* (2013.01); *H01M 10/058* (2013.01); *H01M 10/0525* (2013.01); *H01M 10/0562* (2013.01); *H01M 2004/028* (2013.01); *H01M 2300/0068* (2013.01)

(58) Field of Classification Search
CPC ..................................................... H01M 4/364
See application file for complete search history.

(56) References Cited

U.S. PATENT DOCUMENTS

| | | | |
|---|---|---|---|
| 2015/0349344 A1* | 12/2015 | Shelekhin | H01M 4/62 429/90 |
| 2017/0222254 A1* | 8/2017 | Sakamoto | H01M 4/0485 |
| 2017/0244097 A1* | 8/2017 | Ose | H01M 4/5815 |
| 2018/0080711 A1* | 3/2018 | Ho | H01M 50/411 |
| 2019/0089009 A1* | 3/2019 | Yoshima | H01M 50/20 |

FOREIGN PATENT DOCUMENTS

JP    1999-134937 H    5/1999

* cited by examiner

*Primary Examiner* — Austin Murata
(74) *Attorney, Agent, or Firm* — Morgan, Lewis & Bockius LLP

(57) ABSTRACT

The present disclosure relates to a method of manufacturing a cathode composite for an all-solid-state battery and a method of manufacturing an all-solid-state battery including the same. In particular, the present disclosure relates to a method of manufacturing a cathode composite for an all-solid-state battery in which the cathode composite is manufactured by mixing a solid electrolyte, a conductive material and a cathode active material with a solvent, and then performing two-step vacuum drying, whereby interfacial resistance between the cathode active material, the solid electrolyte and the conductive material is reduced to thus increase ionic conductivity, thereby improving battery performance and capacity, and a method of manufacturing an all-solid-state battery including the same.

14 Claims, 4 Drawing Sheets

METHOD OF MANUFACTURING CATHODE COMPOSITE FOR ALL-SOLID-STATE BATTERY AND METHOD OF MANUFACTURING ALL-SOLID-STATE BATTERY COMPRISING SAME

CROSS REFERENCE TO RELATED APPLICATION

This application claims priority to and the benefit of Korean Patent Application No. 10-2019-0074273, filed on Jun. 21, 2019, which is incorporated herein by reference in its entirety.

FIELD

The present disclosure relates to a method of manufacturing a cathode composite for an all-solid-state battery, in which interfacial resistance between a cathode active material, a solid electrolyte and a conductive material is reduced through solvent mixing and vacuum drying to thus increase ionic conductivity, thereby improving battery performance and capacity, and a method of manufacturing an all-solid-state battery including the same.

BACKGROUND

The statements in this section merely provide background information related to the present disclosure and may not constitute prior art.

Nowadays, secondary batteries are widely used in both large-sized devices, such as vehicles and power storage systems, and small-sized devices, such as mobile phones, camcorders and laptop computers. One example is the lithium secondary battery, which has the advantage of having a larger capacity per unit area than that of a nickel-manganese battery or a nickel-cadmium battery. Unfortunately, lithium secondary batteries are liable to overheat and have an energy density of only about 360 Wh/kg, resulting in poor power output and making them unsuitable for use as next-generation batteries for application to vehicles.

Hence, an all-solid-state battery having high power output and high energy density is receiving attention. An all-solid-state battery includes a cathode including an active material, a solid electrolyte, a conductive material and a binder, an anode, and a solid electrolyte interposed between the cathode and the anode. The cathode of a conventional all-solid-state battery is manufactured by subjecting a cathode active material, a conductive material and a solid electrolyte to mechanical ball milling to afford a mixed powder that is then hot pressed.

However, when manufacturing the cathode for an all-solid-state battery through mechanical milling, the interfacial contact between the cathode active material, the conductive material and the solid electrolyte does not occur properly, thereby undesirably deteriorating battery performance. In addition, the variation in conductivity at the heterogeneous interface may cause a polarization phenomenon, resulting in increased battery resistance, which is also undesirable.

The above information disclosed in this Background section is only for enhancement of understanding of the background of the present disclosure, and therefore it may contain information that does not form the prior art that is already known to a person of ordinary skill in the art.

SUMMARY

The present disclosure provides a method of manufacturing a cathode composite for an all-solid-state battery having improved ionic conductivity by reducing interfacial resistance between a cathode active material, a solid electrolyte and a conductive material through solvent mixing and vacuum drying.

The present disclosure also provides a method of manufacturing an all-solid-state battery, which includes a cathode layer having improved ionic conductivity due to a reduction in interfacial resistance between the materials, thereby increasing battery performance and capacity.

The present disclosure provides a method of manufacturing a cathode composite for an all-solid-state battery, the method comprising preparing a first mixture by mixing a solid electrolyte precursor and a first solvent; preparing a second mixture by mixing a conductive material, a cathode active material and a second solvent; preparing a third mixture by mixing the first mixture and the second mixture; and manufacturing a cathode composite by drying the third mixture.

The solid electrolyte precursor is at least one of $Li_2S$, $P_2S_5$, a $Li_2S$—$P_2S_5$-based compound, or a compound represented by Chemical Formula 1 below:

$Li_aM_bS_cX_d$      [Chemical Formula 1]

wherein X is Cl, Br or I; M is P, N, As, Sb or Bi; a is 1-10; b is 1-6; c is 1-10; and d is 1-6.

The $Li_2S$—$P_2S_5$-based compound may include $Li_2S$ and $P_2S_5$ mixed at a molar ratio ranging from 3:1 to 4:1.

The first solvent and the second solvent may be selected from the group consisting of ethanol, propanol, butanol, dimethyl carbonate, ethyl acetate, tetrahydrofuran, 1,2-dimethoxyethane, propylene glycol dimethyl ether, acetonitrile and combinations thereof.

The first mixture may include 15 to 30 wt % of the solid electrolyte precursor and 70 to 85 wt % of the first solvent.

The conductive material may be selected from the group consisting of Super C, Super P, Ketjen black, Denka black, acetylene black, thermal black, channel black, graphite, carbon fiber, activated carbon, graphene, carbon nanotubes and combinations thereof.

The cathode active material is a polycrystalline or a monocrystalline compound of Chemical Formula 2 below:

$LiNi_xCo_yMn_zO_2$      [Chemical Formula 2]

wherein x is 0-1; y is 0-1; z is 0-1; and x+y+z=1.

The polycrystalline compound may have an average particle size of 3 μm to 12 μm, and the monocrystalline compound may have an average particle size of 3 μm to 10 μm.

The compound represented by Chemical Formula 2 may be selected from the group consisting of $LiNi_{1/3}Co_{1/3}Mn_{1/3}O_2$, $LiNi_{0.5}Co_{0.2}Mn_{0.3}O_2$, $LiNi_{0.6}Co_{0.2}Mn_{0.2}O_2$, $LiNi_{0.7}Co_{0.15}Mn_{0.15}O_2$, $LiNi_{0.8}Co_{0.1}Mn_{0.1}O_2$, $LiNi_{0.9}Co_{0.05}Mn_{0.05}O_2$ and combinations thereof.

The second mixture may include 0.5 to 2 wt % of the conductive material, 30 to 40 wt % of the cathode active material and 58 to 69.5 wt % of the second solvent.

The third mixture may include the first mixture and the second mixture, mixed at a weight ratio ranging from 4:1 to 2:1.

Manufacturing the cathode composite by drying the third mixture may include subjecting the third mixture to primary vacuum drying at a temperature of 0 to 100° C. and a pressure of 0.5 to 0.001 mbar for 0.5 to 4 hr in an inert gas atmosphere and performing secondary vacuum drying of the third mixture subjected to primary vacuum drying at a temperature of 150 to 450° C. and a pressure of 0.5 to 0.001 mbar for 0.5 to 24 hr in an inert gas atmosphere.

The cathode composite may include the cathode active material and a coating layer formed on the cathode active material.

The coating layer may be formed of a mixture comprising the solid electrolyte and the conductive material mixed at a weight ratio ranging from 15:1 to 5:1.

The coating layer may have a thickness of 0.1 μm to 1 μm.

The amount of the coating layer may be 10 to 30 parts by weight based on 100 parts by weight of the cathode active material.

In addition, the present disclosure provides a method of manufacturing an all-solid-state battery, the method comprising manufacturing the cathode composite as above; preparing a cathode composite slurry by dispersing the cathode composite in an organic solvent; manufacturing a cathode layer by applying the cathode composite slurry on a substrate; manufacturing a solid electrolyte layer by applying a solid electrolyte slurry on the cathode layer; and manufacturing an anode layer by applying an anode slurry on the solid electrolyte layer.

According to the present disclosure, a cathode composite for an all-solid-state battery is manufactured through a two-step vacuum drying after mixing a solid electrolyte, a conductive material and a cathode active material with a solvent, thus decreasing interfacial resistance between the cathode active material, the solid electrolyte and the conductive material, and thereby increasing ionic conductivity.

Also, according to the present disclosure, an all-solid-state battery includes a cathode layer having improved ionic conductivity due to a reduction in interfacial resistance between the materials, thereby increasing battery performance and capacity.

The effects of the present disclosure are not limited to the foregoing, and should be understood to include all effects that can be reasonably anticipated from the following description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 schematically shows a process of manufacturing a cathode composite for an all-solid-state battery according to the present disclosure;

Figure 1:
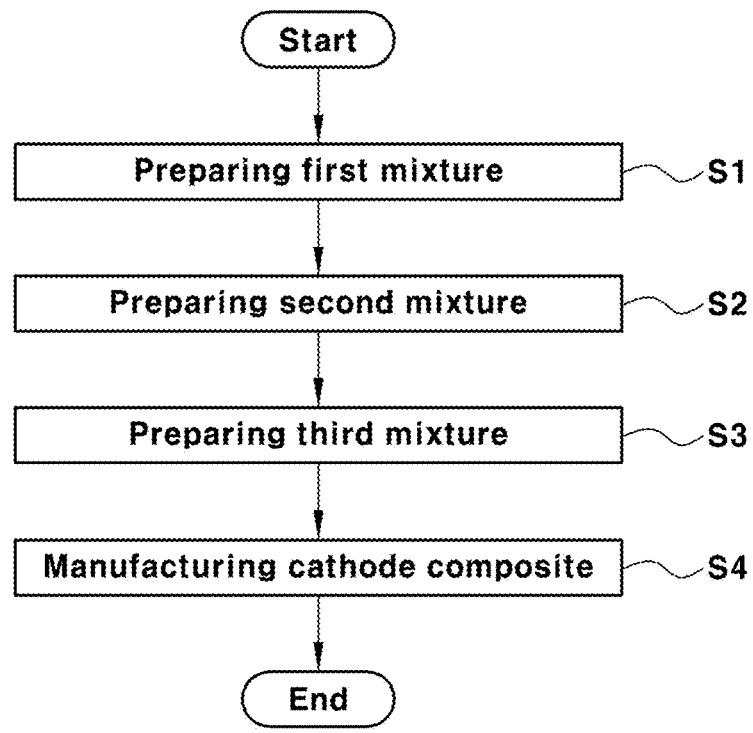

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The above and other objectives, features and advantages of the present disclosure will be more clearly understood from the following forms taken in conjunction with the accompanying drawings. However, the present disclosure is not limited to the forms disclosed herein, and may be modified into different forms. These forms are provided to thoroughly explain the disclosure and to sufficiently transfer the spirit of the present disclosure to those skilled in the art.

Throughout the drawings, the same reference numerals will refer to the same or like elements. For the sake of clarity of the present disclosure, the dimensions of structures are depicted as being larger than the actual sizes thereof. It will be understood that, although terms such as "first" and "second" may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, unless the context clearly indicates otherwise, the singular forms are intended to include the plural forms as well.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting the measurements that essentially occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated.

Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include any subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Hereinafter, a detailed description will be given of the present disclosure.

Regarding the cathode for a conventional all-solid-state battery, we have discovered that the mixed powder of a cathode active material, a conductive material and a solid electrolyte, prepared through mechanical ball milling and hot pressing, causes variation in conductivity due to poor interfacial contact between the materials, thereby deteriorating battery performance and increasing resistance. To address the above issues, a cathode composite is manufactured by mixing the solid electrolyte, the conductive material and the cathode active material with a solvent and then undergoing a two-step vacuum drying, in lieu of the mechanical milling and hot pressing. As a result, the cathode composite according to the present disclosure is capable of reducing the interfacial resistance between the cathode active material, the solid electrolyte and the conductive material and thereby increasing ionic conductivity. Moreover, the all-solid-state battery according to the present disclosure includes a cathode layer having improved ionic conductivity due to a reduction in the interfacial resistance between the materials, thereby increasing battery performance and capacity.

The present disclosure pertains to a method of manufacturing a cathode composite for an all-solid-state battery and a method of manufacturing an all-solid-state battery including the same.

FIG. 1 schematically shows the process of manufacturing a cathode composite for an all-solid-state battery according to the present disclosure. With reference thereto, the method of manufacturing the cathode composite for an all-solid-state battery includes (S1) preparing a first mixture, (S2) preparing a second mixture, (S3) preparing a third mixture, and (S4) manufacturing a cathode composite.

More specifically, the method of manufacturing the cathode composite for an all-solid-state battery according to the present disclosure includes preparing a first mixture by mixing a solid electrolyte precursor and a first solvent, preparing a second mixture by mixing a conductive material, a cathode active material and a second solvent, preparing a third mixture by mixing the first mixture and the second mixture, and manufacturing a cathode composite by drying the third mixture.

The steps of the method of manufacturing the cathode composite for an all-solid-state battery according to the present disclosure are specified below.

1) Preparing First Mixture (S1)

In preparing the first mixture (S1), a solid electrolyte precursor is mixed with a first solvent. In S1, in order to sufficiently dissolve the solid electrolyte precursor in a solvent, it is preferable to mix the solid electrolyte precursor with the first solvent separately from the conductive material and the cathode active material. The solid electrolyte precursor may be a sulfide-based solid electrolyte precursor. Specifically, the solid electrolyte precursor may be at least one of $Li_2S$, $P_2S_5$, a $Li_2S$—$P_2S_5$-based compound, and a compound represented by Chemical Formula 1 below:

$$Li_aM_bS_cX_d \qquad \text{[Chemical Formula 1]}$$

wherein M is P, N, As or Bi; X is Cl, Br or I; a is 1-10; b is 1-6; c is 1-10; and d is 1-6.

The $Li_2S$—$P_2S_5$-based compound may be configured such that $Li_2S$ and $P_2S_5$ are mixed at a molar ratio ranging from 3:1 to 4:1. Specific examples of the $Li_2S$—$P_2S_5$-based compound include $Li_3PS_4$, $Li_7P_3S_{11}$ and $Li_8P_2S_9$.

The first solvent may be selected from the group consisting of ethanol, propanol, butanol, dimethyl carbonate, ethyl acetate, tetrahydrofuran, 1,2-dimethoxyethane, propylene glycol dimethyl ether, acetonitrile and combinations thereof.

The first mixture may include 15 to 30 wt % of the solid electrolyte precursor and 70 to 85 wt % of the first solvent. If the amount of the solid electrolyte precursor is less than 15 wt %, ionic conductivity may decrease. On the other hand, if the amount of the solid electrolyte precursor exceeds 30 wt %, the capacity of the battery may decrease.

2) Preparing Second Mixture (S2)

In preparing the second mixture (S2), a conductive material and a cathode active material is mixed with a second solvent and thus uniformly dispersed therein.

The second solvent may be selected from the group consisting of ethanol, propanol, butanol, dimethyl carbonate, ethyl acetate, tetrahydrofuran, 1,2-dimethoxyethane, propylene glycol dimethyl ether, acetonitrile and combinations thereof.

The conductive material may be selected from the group consisting of Super C, Super P, Ketjen black, Denka black, acetylene black, thermal black, channel black, graphite, carbon fiber, activated carbon, graphene, carbon nanotubes and combinations thereof.

The cathode active material is a polycrystalline or monocrystalline compound of Chemical Formula 2 below:

$$LiNi_xCo_yMn_zO_2 \qquad \text{[Chemical Formula 2]}$$

wherein x is 0-1; y is 0-1; z is 0-1; and x+y+z=1. Wherein x has 0 as the lowest value and 1 as the highest value, y has 0 as the lowest value and 1 as the highest value and z has 0 as the lowest value and 1 as the highest value.

Specifically, the compound represented by Chemical Formula 2 may be selected from the group consisting of $LiNi_{1/3}Co_{1/3}Mn_{1/3}O_2$, $LiNi_{0.5}Co_{0.2}Mn_{0.3}O_2$, $LiNi_{0.6}Co_{0.2}Mn_{0.2}O_2$, $LiNi_{0.7}Co_{0.15}Mn_{0.15}O_2$, $LiNi_{0.8}Co_{0.1}Mn_{0.1}O_2$, $LiNi_{0.9}Co_{0.05}Mn_{0.05}O_2$ and combinations thereof. Preferably useful is $LiNi_{0.6}Co_{0.2}Mn_{0.2}O_2$, $LiNi_{0.7}Co_{0.15}Mn_{0.15}O_2$ or $LiNi_{0.8}Co_{0.1}Mn_{0.1}O_2$.

The polycrystalline compound may have an average particle size of 3 μm to 12 μm, and the monocrystalline compound may have an average particle size of 3 μm to 10 μm. If the average particle size of the polycrystalline compound is less than 3 μm, agglomeration may occur upon electrode coating. On the other hand, if the average particle size thereof exceeds 12 μm, a lithium-ion path may be interrupted.

If the average particle size of the monocrystalline compound is less than 3 μm, agglomeration may occur upon electrode coating. On the other hand, if the average particle size thereof exceeds 10 μm, a lithium-ion path may be interrupted.

The second mixture may include 0.5 to 2 wt % of the conductive material, 30 to 40 wt % of the cathode active material and 58 to 69.5 wt % of the second solvent. If the amount of the cathode active material is less than 30 wt %, battery capacity and energy density may decrease. On the other hand, if the amount of the cathode active material exceeds 40 wt %, the solvent and the conductive material are used in relatively decreased amounts and thus a reduction in electronic conductivity and processing problems may occur. Also, if the amount of the conductive material is less than 0.5 wt %, electronic conductivity may decrease and efficiency and power output may thus deteriorate. On the other hand, if the amount thereof exceeds 2 wt %, electronic conductivity may increase, but processing problems may occur during the preparation of a composite slurry.

3) Preparing Third Mixture (S3)

In preparing the third mixture (S3), the first mixture may be mixed with the second mixture.

The third mixture may include the first mixture and the second mixture, mixed at a weight ratio ranging from 4:1 to 2:1. If the weight ratio of the first mixture and the second mixture is less than 2:1, capacity and energy density may decrease. On the other hand, if the weight ratio of the first mixture and the second mixture exceeds 4:1, ionic conductivity may decrease. Preferably, the third mixture may be configured such that the first mixture and the second mixture are mixed at a weight ratio ranging from 3:1 to 2:1.

4) Manufacturing Cathode Composite (S4)

In manufacturing the cathode composite (S4), the third mixture is dried. In S4, the third mixture may be dried through two steps at different temperatures, thus obtaining a cathode composite.

Manufacturing the cathode composite by drying the third mixture may include subjecting the third mixture to primary vacuum drying at a temperature of 0 to 100° C. and a pressure of 0.5 to 0.001 mbar for 0.5 to 4 hr in an inert gas atmosphere, and performing secondary vacuum drying of the third mixture subjected to primary vacuum drying at a temperature of 150 to 450° C. and a pressure of 0.5 to 0.001 mbar for 0.5 to 24 hr in an inert gas atmosphere.

During the primary vacuum drying, the third mixture may be dried at a temperature of 0 to 100° C. and a pressure of 0.5 to 0.001 mbar for 0.5 to 4 hr in an inert gas atmosphere in order to remove the solvent therefrom. If the drying temperature is higher than 100° C., some of the composition may also be removed. Preferably, the primary vacuum drying is performed at a temperature of 20 to 30° C.

During the secondary vacuum drying, the third mixture subjected to primary vacuum drying may be dried at a temperature of 150 to 450° C. and a pressure of 0.5 to 0.001 mbar for 0.5 to 24 hr in an inert gas atmosphere in order to crystallize the same. Here, if the drying temperature is lower than 150° C., the solid electrolyte does not crystallize. On the other hand, if the drying temperature is higher than 450° C., the composition thereof may change. Preferably, the secondary vacuum drying is performed at a temperature of 200 to 250° C.

During the primary and secondary vacuum drying, the inert gas atmosphere may be an inert gas atmosphere containing Ar.

When the mixed powder is prepared through conventional mechanical ball milling, high-energy milling is performed to realize binding between the cathode active material, the conductive material and the solid electrolyte. However, the cathode composite, in which the surface of the cathode active material is coated with the solid electrolyte and the conductive material, may be manufactured through the drying in S4, even without the use of the milling process.

The cathode composite may include the cathode active material and a coating layer formed on the cathode active material. The coating layer may be formed of a mixture comprising the solid electrolyte and the conductive material mixed at a weight ratio ranging from 15:1 to 5:1. If the weight ratio of the solid electrolyte and the conductive material being mixed is less than 5:1, electronic conductivity may increase but ionic conductivity may decrease. On the other hand, if the weight ratio of the solid electrolyte and the conductive material being mixed exceeds 15:1, ionic conductivity may increase but electronic conductivity may decrease. Preferably, the solid electrolyte and the conductive material are mixed at a weight ratio ranging from 10:1 to 8:1.

The thickness of the coating layer may fall in the range of 0.1 μm to 1 μm. Here, if the thickness of the coating layer is less than 0.1 μm, the entire surface of the cathode active material may not be coated, and thus conductivity may decrease. On the other hand, if the thickness of the coating layer exceeds 1 μm, energy density may decrease.

The amount of the coating layer may be 10 to 30 parts by weight based on 100 parts by weight of the cathode active material. If the amount of the coating layer is less than 10 parts by weight, ionic conductivity and electronic conductivity may decrease. On the other hand, if the amount of the coating layer exceeds 30 parts by weight, energy density may decrease. Preferably, the amount of the coating layer is 15 to 25 parts by weight based on 100 parts by weight of the cathode active material.

In addition, the present disclosure pertains to a method of manufacturing an all-solid-state battery, the method including manufacturing the cathode composite as above, preparing a cathode composite slurry by dispersing the cathode composite in an organic solvent, manufacturing a cathode layer by applying the cathode composite slurry on a substrate, manufacturing a solid electrolyte layer by applying a solid electrolyte slurry on the cathode layer, and manufacturing an anode layer by applying an anode slurry on the solid electrolyte layer.

In the all-solid-state battery, the cathode layer may be manufactured by dispersing the cathode composite in the organic solvent to afford a cathode composite slurry, which is then applied on the substrate. Also, a solid electrolyte layer and an anode layer are sequentially famed on the cathode layer, followed by a firing process, ultimately manufacturing an all-solid-state battery.

A better understanding of the present disclosure will be given through the following examples, which are not to be construed as limiting the present disclosure.

Example 1

$Li_3PS_4$ was used as a solid electrolyte precursor, and tetrahydrofuran (THF) was used as a first solvent and a second solvent. Super C was used as a conductive material and monocrystalline NCM622 ($LiNi_{0.6}Co_{0.2}Mn_{0.2}O_2$) was used as a cathode active material.

A first mixture was prepared by mixing 20 wt % of $Li_3PS_4$ as the solid electrolyte precursor and 80 wt % of THF. A second mixture was prepared by mixing 1 wt % of a conductive material Super C and 39 wt % of a cathode active material monocrystalline NCM622 with 60 wt % of THF.

A third mixture was prepared by mixing the first mixture and the second mixture at a weight ratio of 2.47:1. The third mixture was subjected to primary vacuum drying at a temperature of 25° C. and a pressure of 0.3 mbar for 2 hr in an Ar atmosphere, followed by a secondary vacuum drying at a temperature of 200° C. and a pressure of 0.3 mbar for 16 hr in an Ar atmosphere, thus manufacturing a cathode composite. The cathode composite thus manufactured was configured such that a coating layer having a thickness of 0.3 μm was formed on the surface of the cathode active material. The amount of the coating layer was 27.6 parts by weight based on 100 parts by weight of the cathode active material, and the coating layer was formed of a mixture comprising the solid electrolyte and the conductive material mixed at a weight ratio of 9.57:1.

Example 2

A cathode composite was manufactured in the same manner as in Example 1, except, instead of monocrystalline NCM622, polycrystalline NCM711 was used as the cathode active material.

Comparative Example 1

A cathode composite was manufactured in the same manner as in Example 1, except the cathode was manufactured by mixing a cathode active material, a conductive material and a solid electrolyte at a weight ratio of 40:1:10 and performing typical mechanical ball milling, thus preparing a mixed powder, which was then hot pressed through isotropic pressing.

Comparative Example 2

A cathode composite was manufactured in the same manner as in Example 2, except the second mixture was prepared by mixing 0.3 wt % of a conductive material, 39 wt % of a cathode active material and 60.7 wt % of THF, and the same conductive material in the same amount as in the conductive material contained in the second mixture was additionally mixed with the third mixture.

Test Example 1: Analysis of Structure of Cathode Composite

The structures of the cathode composites of Examples 1 and 2 and Comparative Examples 1 and 2 were observed using a scanning electron microscope (SEM). The results are shown in FIGS. 2 to 7.

Figure 2:
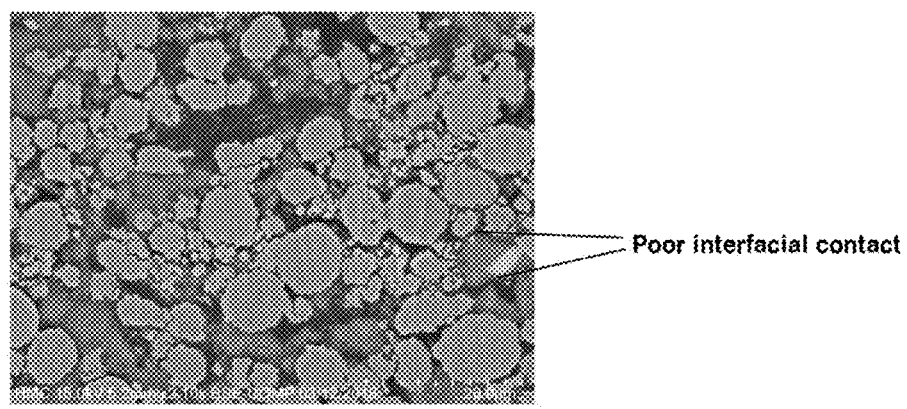
FIG. 2 is a scanning electron microscope (SEM) image showing the cathode composite of Comparative Example 1 according to the present disclosure.

FIG. 2 is an SEM image showing the cathode composite of Comparative Example 1. As shown in FIG. 2, interfacial contact between the polycrystalline cathode active material, the conductive material and the solid electrolyte was poor, or the portions of the conductive material and the solid electrolyte that were not bound to the cathode active material were dispersed.

Figure 3:
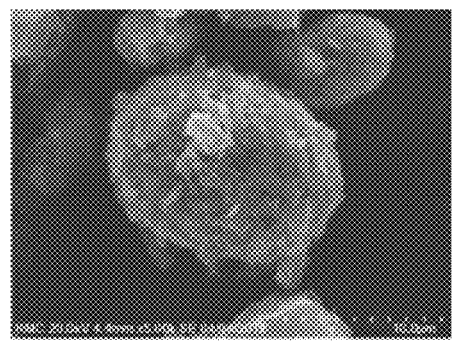
FIG. 3 is an SEM image showing the cathode composite of Comparative Example 2 according to the present disclosure.

FIG. 3 is an SEM image showing the cathode composite of Comparative Example 2. As shown in FIG. 3, the coating layer including the conductive material and the solid electrolyte was not formed on the entire surface of the cathode active material but was partially applied thereon.

Figure 4:
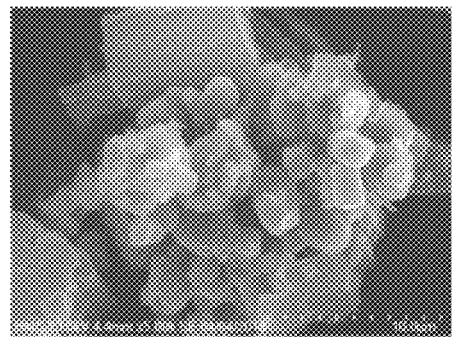
FIG. 4 is an SEM image showing the cathode composite of Example 1 according to the present disclosure.

FIG. 4 is an SEM image showing the cathode composite of Example 1. As shown in FIG. 4, the coating layer was uniformly formed on the surface of the monocrystalline active material.

Figure 5:
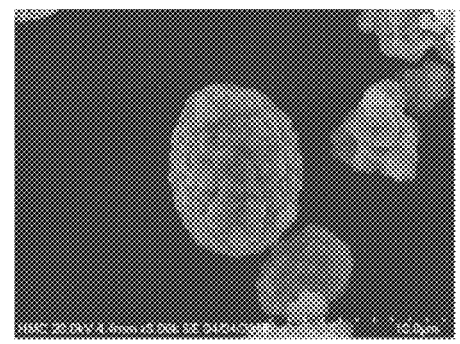
FIG. 5 is an SEM image showing the polycrystalline cathode active material mixed in Example 2 according to the present disclosure.

FIG. 5 is an SEM image showing the polycrystalline cathode active material mixed in Example 2. Specifically, FIG. 5 illustrates the surface of the polycrystalline cathode active material before the formation of the coating layer.

Figure 6:
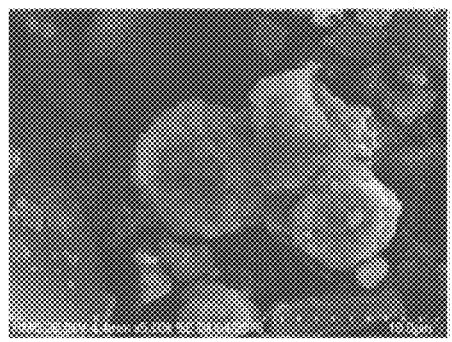
FIG. 6 is an SEM image showing the cathode composite of Example 2 according to the present disclosure.

FIG. 6 is an SEM image showing the cathode composite of Example 2. As shown in FIG. 6, the coating layer was uniformly formed at a predetermined thickness on the surface of the polycrystalline cathode active material.

Figure 7:
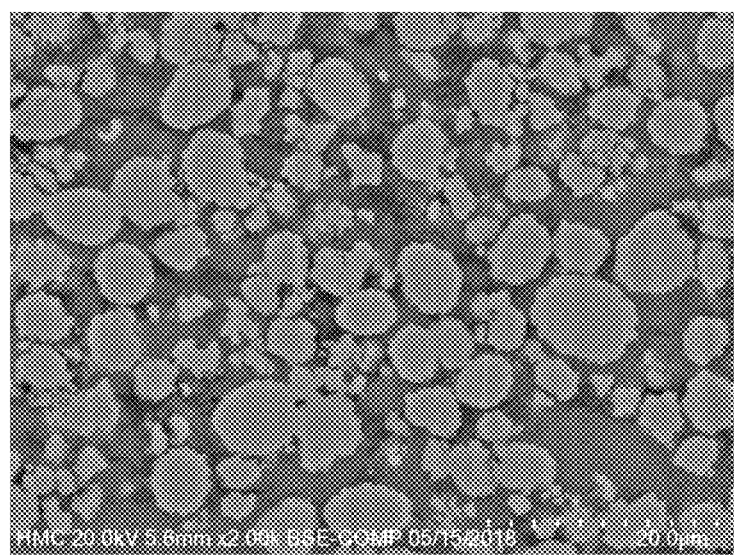
FIG. 7 is an SEM image showing the cross-section of the cathode of an all-solid-state battery using the cathode composite manufactured in Example 2 according to the present disclosure.

FIG. 7 is an SEM image showing the cross-section of the cathode of an all-solid-state battery using the cathode composite manufactured in Example 2. As shown in FIG. 7, the solid electrolyte and the conductive material were efficiently bound to the surface of the cathode active material. Furthermore, the solid electrolyte and the conductive material that were dispersed without being bound to the cathode active material were almost completely absent, unlike what is shown in FIG. 2.

Test Example 2: Evaluation of Charge/Discharge Characteristics

An all-solid-state battery was manufactured using the cathode composite of each of Examples 1 and 2 and Comparative Examples 1 and 2 through the following method. For each all-solid-state battery, charging and discharging were performed under conditions of constant current (CC) in the range of 2.5 to 4.3 V at 0.05 C rate, and the discharge capacity was measured. The results are shown in Table 1 below and FIG. 8.

Specifically, the cathode composite of each of Examples 1 and 2 and Comparative Examples 1 and 2 was mixed with a butyl butyrate solvent to afford a cathode composite slurry, which was then applied on an Al substrate and dried, thus forming a cathode layer. Then, a solid electrolyte layer and an anode layer were sequentially formed on the cathode layer through a typical process, thereby manufacturing an all-solid-state battery. Here, the thickness of the cathode layer was 30 μm, the thickness of the solid electrolyte layer was 500 μm, and the thickness of the anode layer was 100 μm.

For each all-solid-state battery thus manufactured, charging and discharging were performed under conditions of constant current (CC) in the range of 2.5 to 4.3 V at 0.05 C rate, and the discharge capacity was measured. The results are shown in Table 1 below and FIG. 8.

Figure 8:
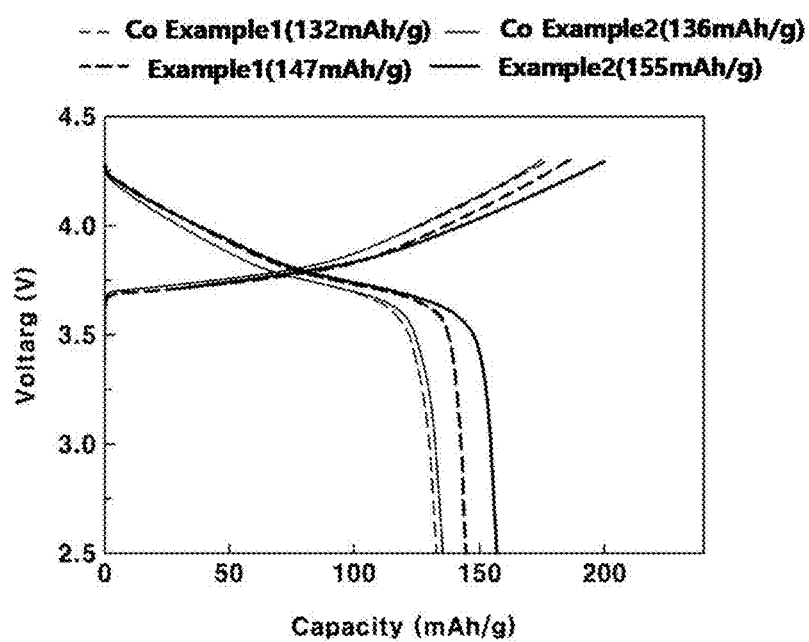
FIG. 8 is a charge/discharge graph of the all-solid-state battery using the cathode composite manufactured in each of Examples 1 and 2 and Comparative Examples 1 and 2 according to the present disclosure.

FIG. 8 is a charge/discharge graph of the all-solid-state battery using the cathode composite manufactured in each of Examples 1 and 2 and Comparative Examples 1 and 2 according to the present disclosure.

TABLE 1

| No. | Crystal structure of cathode active material | Processing conditions | Electronic conductivity (S/cm) | Ionic conductivity (S/cm) | Discharge capacity (mAh/g) |
| --- | --- | --- | --- | --- | --- |
| Comparative Example 1 | Polycrystalline | Mechanical ball milling | $1.9 \times 10^{-4}$ | 0 | 132 |
| Comparative Example 2 | Polycrystalline | Two-step vacuum drying | $6.5 \times 10^{-3}$ | 0 | 136 |

TABLE 1-continued

| No. | Crystal structure of cathode active material | Processing conditions | Electronic conductivity (S/cm) | Ionic conductivity (S/cm) | Discharge capacity (mAh/g) |
|---|---|---|---|---|---|
| Example 1 | Monocrystalline | Two-step vacuum drying | $1.1 \times 10^{-3}$ | $5.1 \times 10^{-6}$ | 147 |
| Example 2 | Polycrystalline | Two-step vacuum drying | $2.9 \times 10^{-3}$ | $1.9 \times 10^{-4}$ | 155 |

As is apparent from the results of Table 1 and FIG. 8, the cathode layer of Comparative Example 1 was manufactured by subjecting the conductive material, the solid electrolyte and the cathode active material to mechanical ball milling, resulting in large interfacial resistance between the materials and great variation in the electronic conductivity and the ionic conductivity.

In Comparative Example 2, in which the mixing order of the conductive material was changed, it was confirmed that great variation in the conductivity occurred, like in Comparative Example 1. In Comparative Example 2, the desired ionic conductivity could not be attained because the conductive material was over-dispersed, thus inhibiting the ions generated in the cathode active material from moving to the electrolyte. In other words, the extent of dispersion of the conductive material can be controlled depending on the mixing order.

In contrast, in Examples 1 and 2, it was confirmed that the difference in crystal structure of the cathode active material affects the conductivity and the battery capacity. In Example 1, in which the cathode active material was monocrystalline, it was confirmed that the conductivity and discharge capacity can be improved by virtue of uniform coating of the cathode active material with the solid electrolyte and the conductive material.

In Example 2, in which the cathode active material was polycrystalline, it was confirmed that the coating of the cathode active material with the solid electrolyte and the conductive material was uniform and that the agglomeration phenomenon was small, indicative of optimum values of conductivity and discharge capacity. Furthermore, it was possible to significantly improve the conductivity and discharge capacity by enhancing the binding force between the materials through two-step vacuum drying, rather than mechanical ball milling used in Comparative Example 1.

While this present disclosure has been described in connection with what is presently considered to be practical exemplary forms, it is to be understood that the present disclosure is not limited to the disclosed forms, but, on the contrary, it is intended to cover various modification and equivalent arrangements included within the sprit and cope of the present disclosure.

What is claimed is:

1. A method of manufacturing a cathode composite for an all-solid-state battery, the method comprising:
preparing a first mixture by mixing a solid electrolyte precursor and a first solvent;
preparing a second mixture by mixing a conductive material, a cathode active material and a second solvent;
preparing a third mixture by mixing the first mixture and the second mixture; and
manufacturing a cathode composite by drying the third mixture,
wherein the first mixture comprises 15 to 30 wt % of the solid electrolyte precursor and 70 to 85 wt % of the first solvent,
wherein the second mixture comprises 0.5 to 2 wt % of the conductive material, 30 to 40 wt % of the cathode active material and 58 to 69.5 wt % of the second solvent, and
wherein the manufacturing the cathode composite by drying the third mixture comprises:
subjecting the third mixture to primary vacuum drying at a temperature of 0 to 100° C. and a pressure of 0.5 to 0.001 mbar for 0.5 to 4 hr in an inert gas atmosphere; and
performing secondary vacuum drying of the third mixture subjected to primary vacuum drying at a temperature of 150 to 450° C. and a pressure of 0.5 to 0.001 mbar for 0.5 to 24 hr in an inert gas atmosphere.

2. The method of claim 1, wherein the solid electrolyte precursor is at least one of $Li_2S$, $P_2S_5$, a $Li_2S$-$P_2S_5$-based compound, or a compound of Chemical Formula 1 below:

$$Li_aM_bS_cX_d \quad \text{[Chemical Formula 1]}$$

wherein
X is Cl, Br or I;
M is P, N, As, Sb or Bi;
a is 1-10;
b is 1-6;
c is 1-10; and
d is 1-6.

3. The method of claim 2, wherein the $Li_2S$-$P_2S_5$-based compound comprises $Li_2S$ and $P_2S_5$ mixed at a molar ratio ranging from 3:1 to 4:1.

4. The method of claim 1, wherein the first solvent and the second solvent are selected from the group consisting of ethanol, propanol, butanol, dimethyl carbonate, ethyl acetate, tetrahydrofuran, 1,2-dimethoxyethane, propylene glycol dimethyl ether, acetonitrile and combinations thereof.

5. The method of claim 1, wherein the conductive material is selected from the group consisting of carbon black, graphite, carbon fiber, activated carbon, graphene, carbon nanotubes and combinations thereof.

6. The method of claim 1, wherein the cathode active material is a polycrystalline or a monocrystalline compound of Chemical Formula 2 below:

$$LiNi_xCo_yMn_zO_2 \quad \text{[Chemical Formula 2]}$$

wherein
x is 0-1;
y is 0-1;
z is 0-1; and
x+y+z=1.

7. The method of claim 6, wherein the polycrystalline compound has an average particle size of 3 μm to 12 μm, and the monocrystalline compound has an average particle size of 3 μm to 10 μm.

8. The method of claim 6, wherein the compound represented by Chemical Formula 2 is selected from the group consisting of $LiNi_{1/3}Co_{1/3}Mn_{1/3}O_2$, $LiNi_{0.5}Co_{0.2}Mn_{0.3}O_2$, $LiNi_{0.6}Co_{0.2}Mn_{0.2}O_2$, $LiNi_{0.7}Co_{0.15}Mn_{0.15}O_2$, $LiNi_{0.8}Co_{0.1}Mn_{0.1}O_2$, $LiNi_{0.9}Co_{0.5}Mn_{0.5}O_2$ and combinations thereof.

9. The method of claim 1, wherein the third mixture comprises the first mixture and the second mixture mixed at a weight ratio ranging from 4:1 to 2:1.

10. The method of claim 1, wherein a coating layer is formed on the cathode composite.

11. The method of claim 10, wherein the coating layer is formed of a mixture comprising a solid electrolyte and the conductive material mixed at a weight ratio ranging from 15:1 to 5:1.

12. The method of claim 10, wherein the coating layer has a thickness of 0.1 µm to 1 µm.

13. The method of claim 10, wherein an amount of the coating layer is 10 to 30 parts by weight based on 100 parts by weight of the cathode active material.

14. A method of manufacturing an all-solid-state battery, the method comprising:
   manufacturing the cathode composite of claim 1;
   preparing a cathode composite slurry by dispersing the cathode composite in an organic solvent;
   manufacturing a cathode layer by applying the cathode composite slurry on a substrate;
   manufacturing a solid electrolyte layer by applying a solid electrolyte slurry on the cathode layer; and
   manufacturing an anode layer by applying an anode slurry on the solid electrolyte layer.

* * * * *